United States Patent
Shimizu

(10) Patent No.: US 7,721,986 B2
(45) Date of Patent: May 25, 2010

(54) FISHING SPINNING REEL

(75) Inventor: Yoshihito Shimizu, Tokyo (JP)

(73) Assignee: Daiwa Seiko, Inc., Tokyo (JP)

( * ) Notice: Subject to any disclaimer, the term of this patent is extended or adjusted under 35 U.S.C. 154(b) by 7 days.

(21) Appl. No.: 12/031,737

(22) Filed: Feb. 15, 2008

(65) Prior Publication Data

US 2008/0203206 A1    Aug. 28, 2008

(30) Foreign Application Priority Data

Feb. 23, 2007 (JP) .............................. 2007-043457

(51) Int. Cl.
*A01K 89/027* (2006.01)

(52) U.S. Cl. ...................... 242/246; 242/245

(58) Field of Classification Search .......... 242/244–246
See application file for complete search history.

(56) References Cited

U.S. PATENT DOCUMENTS

| | | | | |
|---|---|---|---|---|
| 4,591,108 A | * | 5/1986 | Ban ........................... | 242/245 |
| 5,186,412 A | * | 2/1993 | Park ........................... | 242/245 |
| 5,195,698 A | * | 3/1993 | Kyoichi ..................... | 242/245 |
| 5,201,477 A | * | 4/1993 | Kawabe ..................... | 242/245 |
| 5,511,735 A | * | 4/1996 | Kaneko ...................... | 242/245 |
| 5,593,102 A | * | 1/1997 | Yamaguchi ................ | 242/246 |
| 5,816,516 A | * | 10/1998 | Yamaguchi ................ | 242/246 |
| 6,039,278 A | * | 3/2000 | Tao ............................. | 242/246 |
| 6,098,908 A | * | 8/2000 | Ng .............................. | 242/246 |
| 6,328,239 B1 | * | 12/2001 | Chang ........................ | 242/245 |
| 7,055,771 B2 | * | 6/2006 | Wiest ......................... | 242/244 |

FOREIGN PATENT DOCUMENTS

| | | |
|---|---|---|
| EP | 0649595 A1 | 4/1995 |
| EP | 0985343 A1 | 3/2000 |
| JP | 6-97933 B2 | 12/1994 |
| JP | 3542284 B2 | 4/2004 |

OTHER PUBLICATIONS

American Psychological Association (APA): gear. (n.d.). Dictionary.com Unabridged (v 1.1). Retrieved Sep. 9, 2009, from Dictionary.com website: http://dictionary.reference.com/browse/gear.*
Partial European Search Report dated Jul. 1, 2008.

* cited by examiner

*Primary Examiner*—Evan H Langdon
(74) *Attorney, Agent, or Firm*—Sughrue Mion, PLLC

(57) ABSTRACT

A fishing spinning reel of the invention includes a spool wound with a fish line, a rotor rotatable through a pinion gear brought in mesh with a drive gear rotated by a winding operation of a handle, a switch mechanism including a switch lever capable of operating to switch a restricting state of restricting rotation of the spool and a free state of making the spool free, and a return mechanism for returning the switch mechanism brought into the spool free state to the restricting state by the winding operation of the handle. The return mechanism includes a connecting gear brought in mesh with a gear driven by the drive gear, and a kick member rotatably supported centering on the connecting gear, and a center of a mesh portion of the gear and the connecting gear is arranged on a side of the drive gear relative to an axis center of the pinion gear.

1 Claim, 7 Drawing Sheets

FISHING SPINNING REEL

BACKGROUND OF THE INVENTION

The present invention relates to a fishing spinning reel including a switch mechanism for switching a drag mechanism for applying a rotation resistance to a spool to an operating state and a nonoperating state.

There is known a fishing spinning reel including, at inside of a reel main body, a switch mechanism for switching a drag mechanism for applying a rotation resistance to a spool into an operating state in which a drag force to a spool is applied, and a nonoperating state, the nonoperating state including a state of allowing a spool to rotate completely freely and a state of operating a drag force by a sub-drag mechanism. For example, JP-B-6-97933 discloses a fishing spinning reel capable of switching a drag mechanism to operating state/nonoperating state by operating a switch lever pivotably supported in a front and rear direction of an upper portion of a reel main body. Further, the switch mechanism is engaged with a return mechanism capable of automatically returning from the nonoperating state to the operating state when a handle is operated to wind.

The return mechanism disclosed in JP-B-6-97933 mentioned above is installed to spaces on an opposed tooth face side of a drag gear (face gear) mounted to a handle shaft and on a side of a lid plate constituting the reel main body, and therefore, there poses a problem that the reel main body is large-sized.

Hence, in order to resolve the problem, Japanese Patent No. 3542284 discloses a fishing spinning reel capable of downsizing a reel main body by fixing a cam wheel to an end portion of a handle shaft (tooth face side of a face gear) and installing a return mechanism to a position remote from the face gear (a comparatively unoccupied space of the end portion of the handle shaft on the face gear tooth face side).

Meanwhile, generally, the return mechanism is a mechanism for returning a switch lever automatically to an initial position (a position of a state of operating a drag mechanism) by a winding operation of a handle, and is constructed by a mechanism of returning the switch lever to the initial position by contacting (kicking) a member (kick member) rotated by the winding operation of the handle along with a winding operation thereof to an engaging member.

In the return mechanism disclosed in Japanese Patent No. 3542284 mentioned above, a rotational force of the handle (return force of a switch lever) is transmitted to a first lever 52 supported by a switch lever 45 for controlling to engage and disengage with and from a lock ring on a spool shaft to return to a drag operating state through the cam wheel 42 fixed to the end portion of the handle shaft, a pivotable cam follower (engaging member) 58 urged by a second toggle spring 60, a second lever 53 and the like.

However, according to the above-described structure, members constituting the switch mechanism and the return mechanism are only installed by utilizing an unoccupied space at inside of the reel main body and the reel main body is not subjected to thinned formation/compact formation basically by effectively utilizing a dead space at inside of the reel main body.

SUMMARY OF THE INVENTION

The invention has been carried out based on the above-described problem and it is an object thereof to make a reel main body as thin and as compact as possible in a fishing spinning reel including a switch mechanism and a return mechanism for switching a drag force applied to a spool to operating state/nonoperating state.

In order to achieve the above-described object, a fishing reel according to the invention is characterized in comprising a fishing spinning reel characterized in a fishing spinning reel comprising a spool provided at a front portion of a reel main body and wound with a fish line, a rotor rotatable through a pinion gear brought in mesh with a drive gear rotated by a winding operation of a handle rotatably supported by the reel main body for guiding to wind the fish line to the spool through a fish line guiding portion, a switch mechanism including an operating member capable of switching to a restricting state of restricting rotation of the spool and a free state of making the spool free, and a return mechanism for returning the switch mechanism brought into the spool free state to the restricting state by the winding operation of the handle, wherein the return mechanism includes a connecting gear brought in mesh with a gear driven by the drive gear, and a kick member rotatably supported on the connecting gear, and wherein a center of a mesh portion of the gear and the connecting gear is arranged on a side of the drive gear relative to an axis center of the pinion gear.

According to the fishing spinning reel in the above-described structure, the kick member constituting the return mechanism is rotatably supported on the connecting gear brought in mesh with the gear driven by the drive gear, and therefore, the kick member can be arranged together at a center portion of the drive gear, and the reel main body can be downsized. Further, by arranging the center of the mesh portion of the gear and the connecting gear on the side of the drive gear relative to the axis center of the pinion gear, the kick member can be arranged to be proximate to the tooth face side of the drive gear and the reel main body can be made to be as thin and as compact as possible.

According to the invention, the reel main body constituting the fishing reel including the switch mechanism and the return mechanism for switching the drag force for the spool into operating state/nonoperating state is made to be as thin and as compact as possible.

Figure 1:
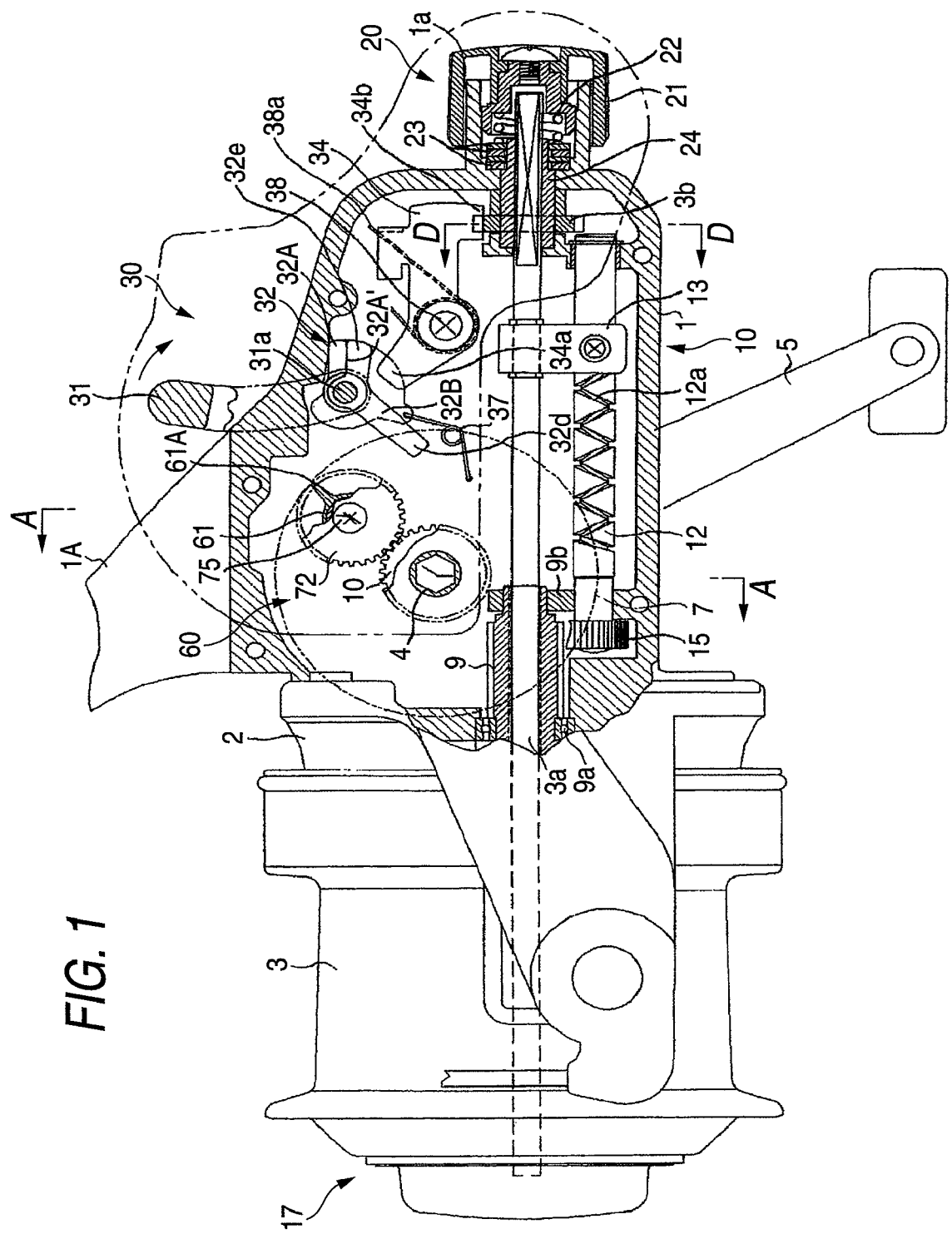
FIG. 1 is a view showing an embodiment of the invention and is a view showing an inside structure of a fishing spinning reel (drag operating state; switch lever ON).

1 . . . reel main body
2 . . . rotor
3 . . . spool
4 . . . handle shaft (drive shaft)
5 . . . handle
7 . . . drive gear
9 . . . pinion gear
17 . . . drag mechanism
20 . . . sub-drag mechanism
30 . . . switch mechanism
32 . . . switch lever
60 . . . return mechanism
61 . . . kick member

DETAILED DESCRIPTION OF PREFERRED EMBODIMENTS

A fishing spinning reel according to an embodiment of the invention will be described with reference to attached drawings hereinafter.

Figure 2:
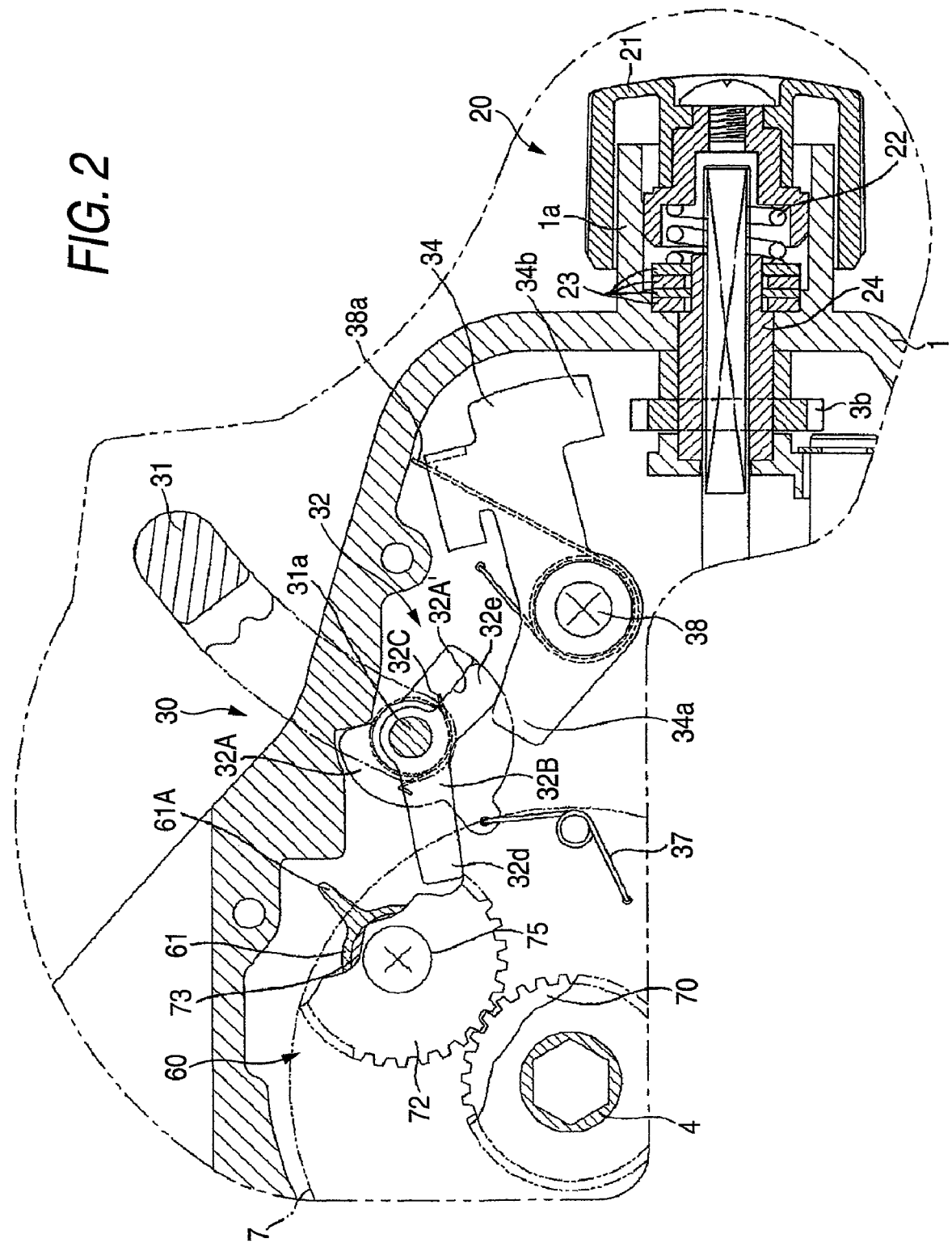
FIG. 2 is a view enlarging an essential portion of FIG. 1 (drag nonoperating state; switch lever OFF).
Figure 3:
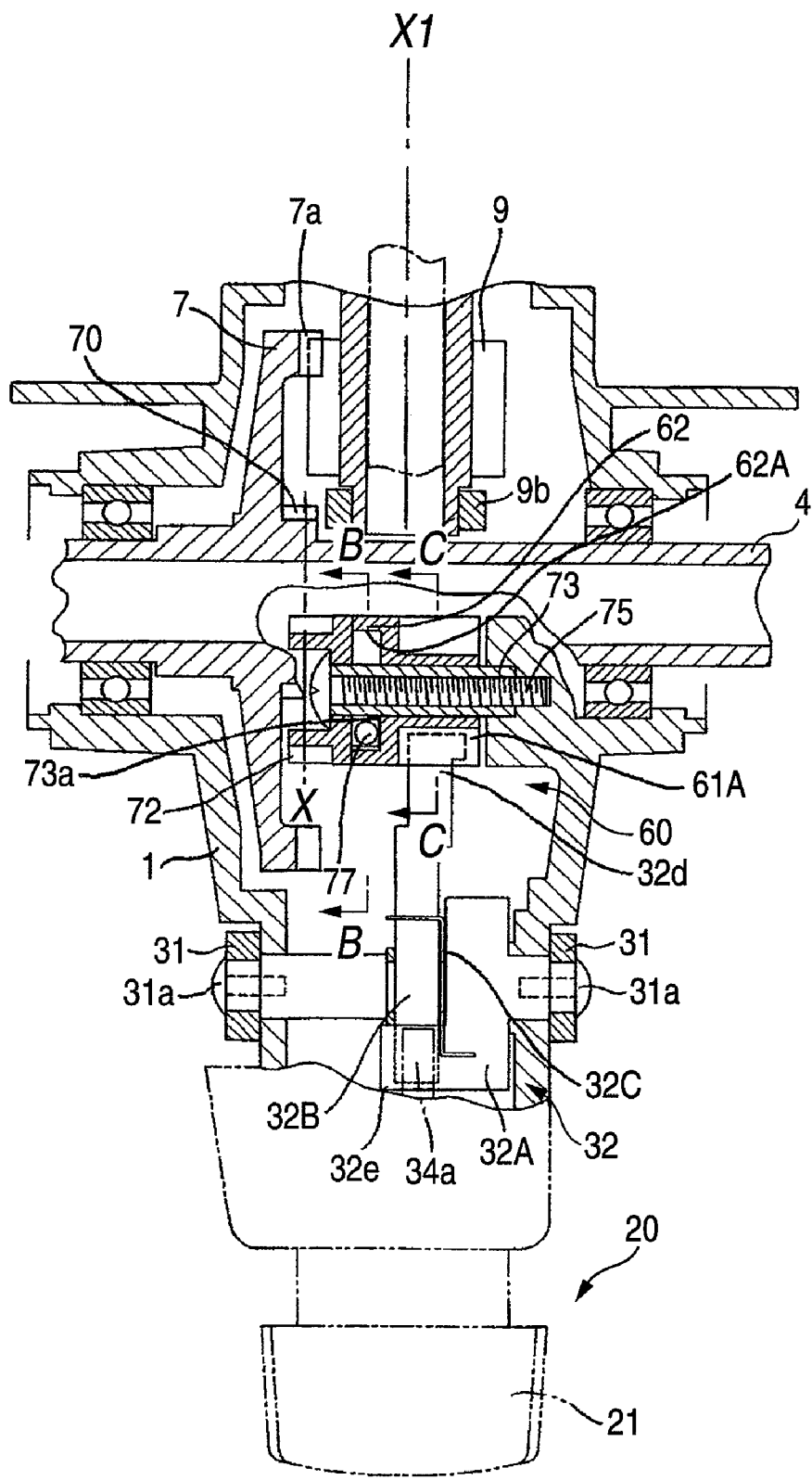
FIG. 3 is a partial sectional view viewing a reel main body from an upper side.
Figure 4:
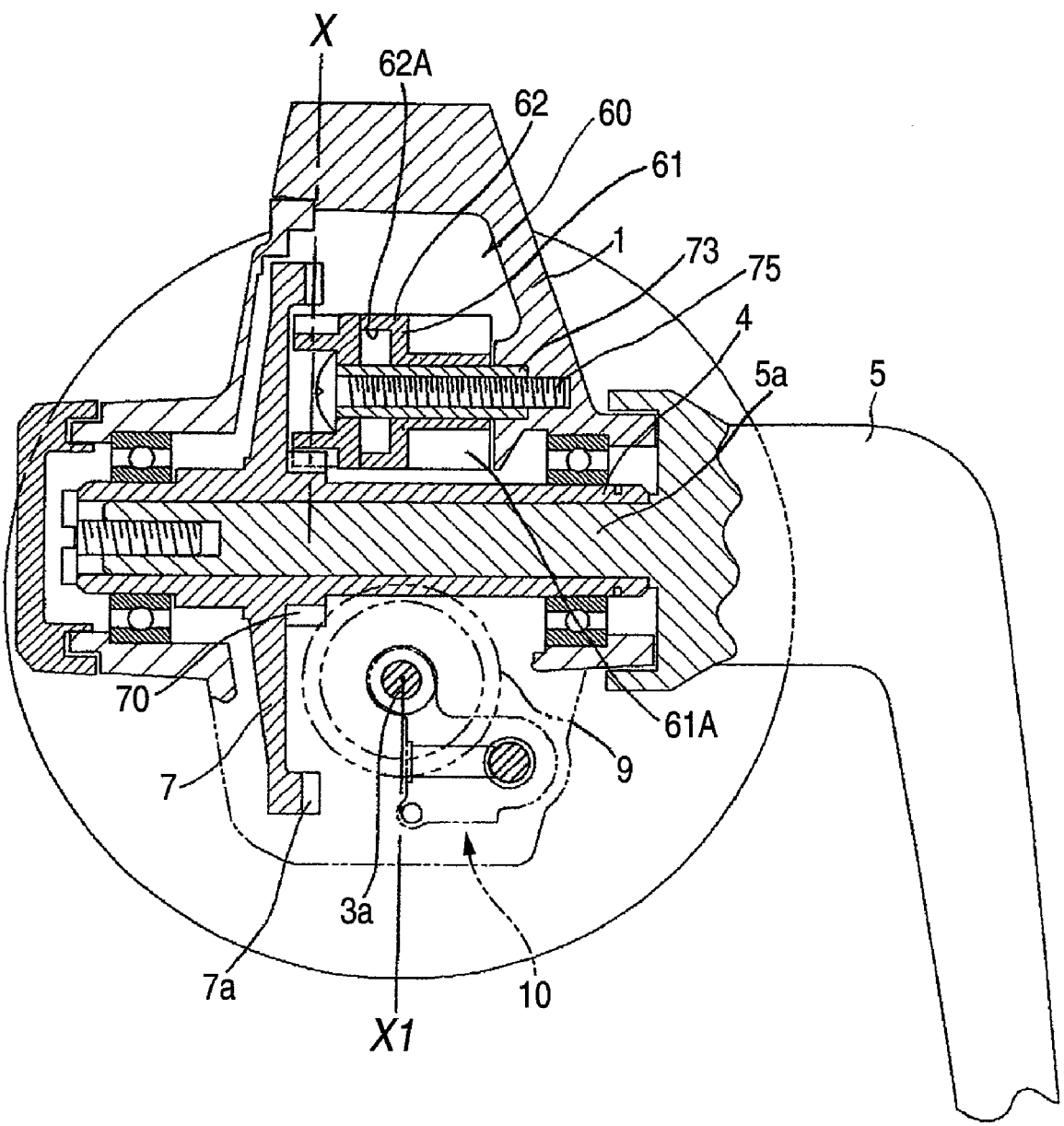
FIG. 4 is a sectional view taken along a line A-A of FIG. 1.
Figure 5:
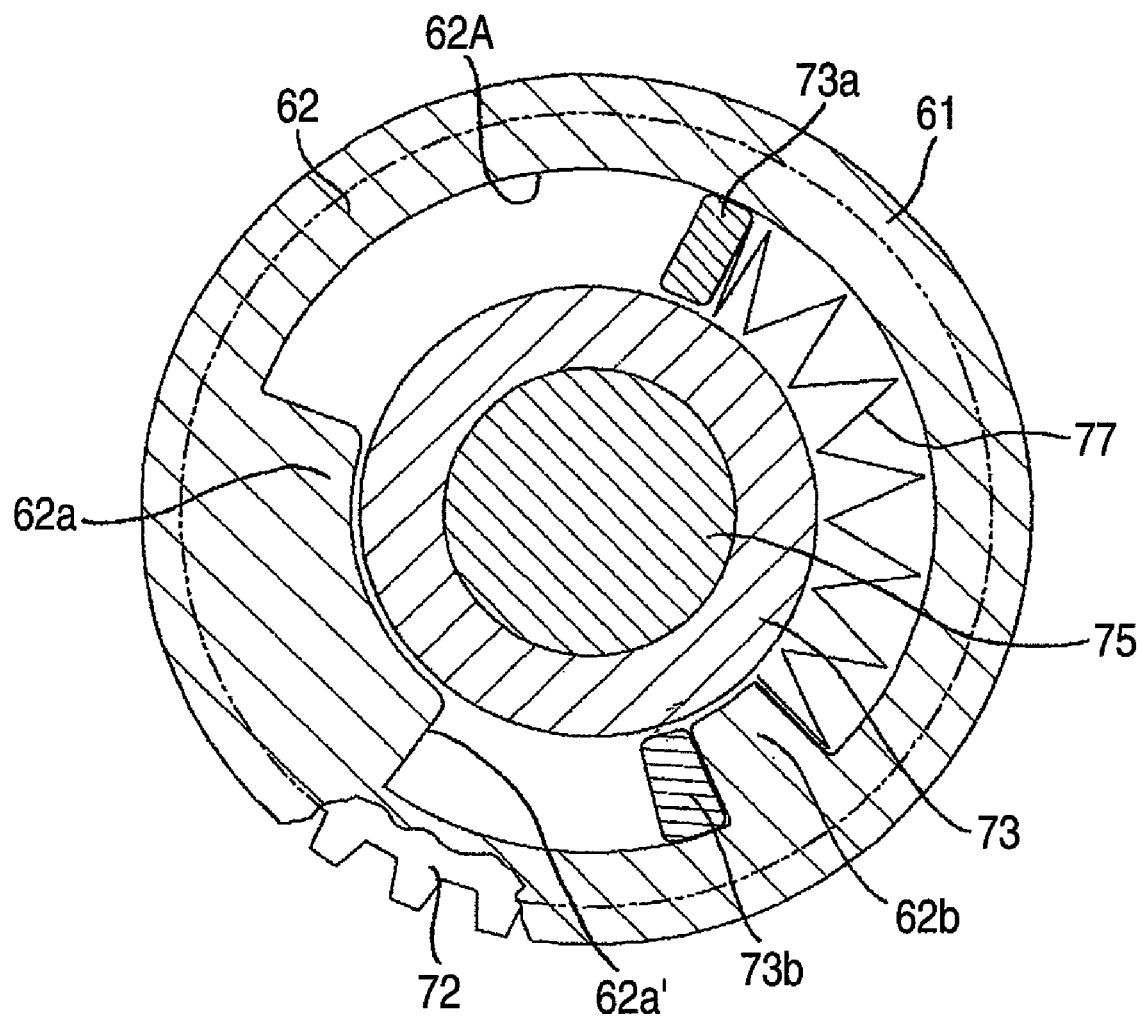
FIG. 5 is a sectional view taken along a direction B-B of FIG. 3.
Figure 6:
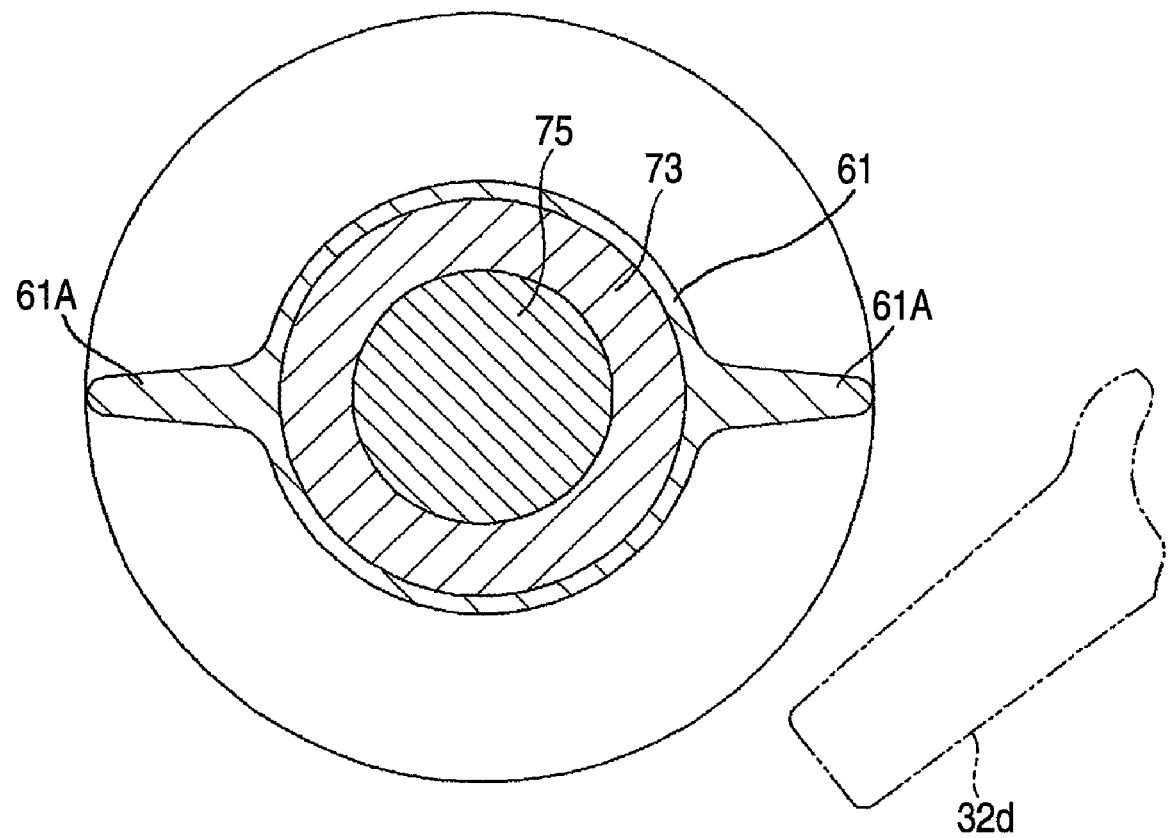
FIG. 6 is a sectional view taken along a line C-C of FIG. 3.
Figure 7:
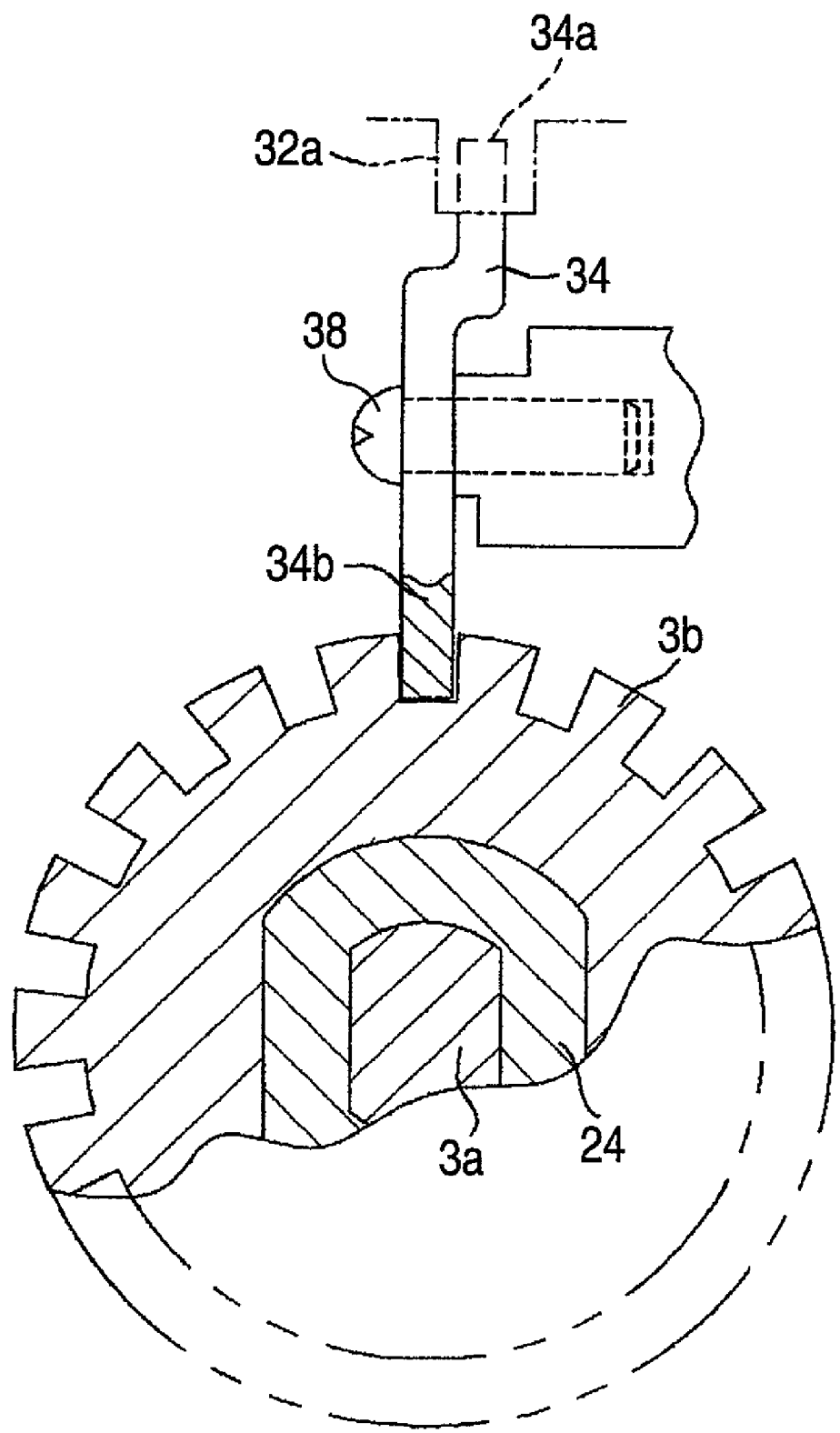
FIG. 7 is a sectional view taken along a direction D-D of FIG. 1.

FIG. 1 through FIG. 7 are drawings showing an embodiment of the invention, FIG. 1 is a view showing an inside structure of a fishing spinning reel (drag operating state; switch lever ON), FIG. 2 is a view enlarging an essential portion of FIG. 1 (drag nonoperating state; switch lever OFF), FIG. 3 is a partial sectional view viewing a reel main body from an upper side, FIG. 4 is a sectional view taken along a line A-A of FIG. 1, FIG. 5 is a sectional view taken along a line B-B of FIG. 3, FIG. 6 is a sectional view taken along a line C-C of FIG. 3, and FIG. 7 is a sectional view taken along a line D-D of FIG. 1.

A reel main body 1 of a fishing spinning reel is integrally formed with a reel leg 1A mounted to a fishing rod, includes a fish line guiding portion (not illustrated) at a front side thereof, and arranged with a rotor 2 rotatably supported and a spool 3 provided to be able to be moved in a front and rear direction in synchronism with a rotating movement of the rotor 2 and wound with a fish line.

At inside of the reel main body 1, a handle shaft (drive shaft) 4 is rotatably supported and a projected end portion thereof is attached with a handle 5. Further, the handle shaft 4 is engaged with a winding drive mechanism, and the winding drive mechanism includes a drive gear (face gear) 7 attached to the handle shaft 4 and formed with inner teeth (teeth portion 7a), and a pinion gear 9 brought in mesh with the drive gear 7 and extended in a direction orthogonal to the handle shaft 4 and formed with a hollow portion extended in an axial direction at inside thereof.

Further, according to the embodiment, as shown by FIG. 4, the handle 5 is made to be able to be mounted to both left and right sides, and is designed so that, as it is known, a projected shaft 5a thereof having a noncircular outer periphery is unrotatably fitted to a hollow shaft integrated with the face gear 7. Here, the hollow shaft having the noncircular inner periphery integrated with the face gear 7 and rotated integrally with the shaft 5a is referred to as a handle shaft (drive shaft) 4.

The pinion gear 9 is rotatably supported at inside of the reel main body through bearings 9a, 9b and connected to the rotor 2 to rotate integrally therewith. Further, a hollow portion thereof is inserted with a spool shaft 3a extended in a direction orthogonal to the handle shaft 4 and mounted with the spool 3 at a front end side thereof movably in an axial direction. Further, the pinion gear 9 is engaged with a known reciprocating apparatus 10 for reciprocating the spool 3 (spool shaft 3a) in a front and rear direction.

The reciprocating apparatus 10 includes a screw shaft (worm shaft) 12 rotatably supported at inside of the reel main body and extended in parallel with the spool shaft 3a, and a sliding member 13 engaged with a rear portion of the spool shaft 3a rotatably and unmovably in the axial direction. An end portion of the screw shaft 12 is provided with an oscillating gear 15 brought in mesh with the pinion gear 9, and by operating to rotate the handle 5, the screw shaft 12 is driven to rotate through the pinion gear 9 and the oscillating gear 15. Further, a peripheral face of the screw shaft 12 is formed with a cam groove 12a in a spiral shape, and by engaging an engaging pin contained to be held by the sliding member 13 with the cam groove 12a, the spool shaft 3a (spool 3) is reciprocated in the front and rear direction by the winding operation of the handle 5.

By the above-described structure, when the handle 5 is operated to wind, the rotor 2 is driven to rotate through the drive gear 7 and the pinion gear 9, further, the spool 3 is driven to reciprocate in the front and rear direction through the drive gear 7, the pinion gear 9 and the reciprocating apparatus 10, and the spool 3 is uniformly wound with the fish line through the fish line guiding portion of the rotating rotor 2.

A known drive mechanism (front drag mechanism) 17 for exerting a brake force to rotation of the spool, not illustrated, is installed between the spool 3 and the spool shaft 3a. Further, a rear end side of the spool shaft 3a is installed with a sub-drag mechanism 20 to be able to exert auxiliarily a brake force (drag force) to the spool shaft 3a when the spool 3 is brought into a free state (state of rotating freely the spool shaft 3a) by a switch mechanism mentioned later.

Specifically, the sub-drag mechanism 20 includes an adjusting screw 21 operated to rotate relative to a cylindrical portion projected to be formed at a rear end portion of the reel main body 1, and a brake member 23 for enabling to exert a predetermined brake force through a press spring 22 by moving in the axial direction in accordance with operating to rotate the adjusting screw 21. A rear end side of the spool shaft 3a is arranged with a collar 24 for inserting a noncircular portion of a rear portion of the spool shaft 3a in a state of being unrotatably fitted to be unable to move in the axial direction, the brake member 23 operates the brake force between the reel main body 1 and the collar 24, and even when the spool shaft 3a is brought into a freely rotatable state by the switch mechanism, by operating to rotate the adjusting screw 21, the brake force is made to be able to be operated auxiliary to rotation of the spool 3.

Inside of the reel main body 1 is provided with a switch mechanism 30 for switching to a restricting state of restricting rotation of the spool 3 and a free state of making the spool free, and a return mechanism 60 for returning the switch mechanism 30 in the spool free state to the restricting state by the winding operation of the handle 5. The mechanisms will be explained as follows. Further, 'restricting state of the spool' in the embodiment means a state in which a desired drag force is applied between the spool shaft 3a and the drag mechanism 17 or a spool lock state, and 'spool free state' means a state in which the spool shaft 3a is allowed to rotate freely. The spool free state includes a state in which a small rotation resistance is applied to the spool by the sub-drag mechanism 20.

The switch mechanism 30 includes a switch lever (operating member) 31 projected from the reel main body 1 to outside and capable of being operated to pivot, an operating member 32 constituted by two members 32A, 32B and a stopper member 34 engaged with one end side of the operating member 32B as follows.

The operating member 32 includes the operating plate 32A pivotably arranged on a fixing screw 31a constituting a support shaft, and a kick side plate 32B installed coaxially with the operating plate 32A and pivotably to overlap a side of the driver gear and capable of moving into a rotating path of a kick member 61 mentioned later.

A friction spring 32C is wound around a region of supporting centers of the two plates 32A, 32B. When the switch lever 31 is pivoted in an arrow mark direction from a position shown in FIG. 1, in accordance with pivoting the operating plate 32A in the clockwise direction, the kick side plate 32B is integrally pivoted in the clockwise direction. That is, by operating to pivot the switch lever 31 in the arrow mark direction from the position shown in FIG. 1, as shown by FIG. 2, a side portion of a contact portion 32e of the kick side plate 32B is brought into contact with a wall portion 32A' of the operating plate 32A to integrally pivot, and an engaging portion 32d formed at a front end of the kick side plate 32B moves into a rotating path of a cam piece 61A of the kick member 61 as shown by FIG. 2. Further, the friction spring 32C urges a side portion of the contact portion 32e always in a direction of being brought into contact with the wall portion 32A'.

Further, the contact portion 32e centering on the fixing screw 31a of the kick side plate 32B is formed on a side opposed to the engaging portion 32d. By operating to pivot the switch lever 31, the contact portion 32e is brought into contact with a contact portion 34a of the stopper member 34 pivotably supported by a support shaft 38. Further, the operation of pivoting the operating member 32 is distributed to be maintained in the switch lever ON state shown in FIG. 1 and the switch lever OFF state shown in FIG. 2 by a distributing spring 37 installed between the operating plate 32A and the reel main body 1.

As shown by FIG. 3, the switch lever 31 is arranged to pinch an upper side of the reel main body 1 and is pivotably supported by a pair of the fixing screws 31a from both sides of a base end portion. The pair of the fixing screws 31a are inserted from both sides to inside of the reel main body and connected to the operating member 32.

The stopper member 34 driven to pivot by the contact portion 32e of the kick side plate 32B is axially supported pivotably on the support shaft 38, one end side thereof is formed with a contact portion 34a for bringing the contact portion 32e into contact therewith, and other end side thereof is formed with an engaging/disengaging portion 34b engaged with and disengaged from a ratchet 3b unrotatably fixed to the spool shaft 3a (refer to FIG. 1, FIG. 2, FIG. 7).

Further, the stopper member 34 is urged such that the engaging/disengaging portion 34b is always engaged with the ratchet 3b by a spring 38a mounted to the support shaft 38, and by pivoting the switch lever 31 into an OFF state, by the operating member 32, the stopper member 34 is pivoted against an urge force of the spring 38a to be detached from the ratchet 3b (refer to FIG. 2).

Further, by the switch mechanism 30, the switch lever 31 switched to the spool free state is returned to the state shown in FIG. 1 by the return mechanism 60. A structure of the return mechanism 60 will be explained as follows.

The return mechanism 60 according to the embodiment includes the kick member 61 installed at a position offset from the handle shaft 4. The kick member 61 is supported to be able to rotate by a predetermined angle around a rotation center of a connecting gear 72 brought in mesh with a gear 70 rotated by the drive gear 7. The kick member 61 is urged by a spring in a rotation direction.

The part constituting the return mechanism is arranged at the position offset from the drive shaft of the drive gear, and therefore, a communicating path to the operating portion for controlling to switch the drag mechanism can be shortened, or directly connected to the operating portion, and therefore, a return force by rotating the handle can efficiently be transmitted to the operating portion, and the switching and returning operation can be stabilized.

Further, parts constituting the return mechanism are arranged together on a support portion for supporting the rotating member rotated in conjunction with the operation of rotating the handle, and therefore, the space can be saved as less as possible and the reel main body can be downsized.

Positions of installing the gear 70 and the connecting gear 72 affect an influence on an arrangement mode of the kick member 61, and therefore, the positions are set such that the reel main body 1 is made to be able to be as thin and as compact as possible. Specifically, as shown by FIG. 3, a portion (disposed on a line indicated by line X) constituting a center of a mesh portion of the gear 70 and the connecting gear 72 (center in a tooth width direction of the mesh portion) is set to be disposed on a side of the drive gear 7 relative to a rotation center (axis center of the pinion gear 9 indicated by line X1) of the spool shaft 3a (pinion gear 9).

According to the embodiment, as shown by FIG. 3, the gear 70 rotated by the drive gear 7 is integrally formed with the drive gear 7 (may be integrated by separated members), and is installed on an inner side in a radial direction relative to the teeth portion 7a of the drive gear 7. Therefore, the connecting gear 72 is rotatably supported by the reel main body 1 to be brought in mesh therewith on a reel leg side offset from the handle shaft 4 having the gear 70. Specifically, the connecting gear 72 is interposed with a collar 73 at a rotation center portion, fitted to penetrate the collar 73 and rotatably supported by a fixing screw 75 screwed to a side plate on a side of the handle of the reel main body 1.

Here, an explanation will be given of a mode of supporting the kick member 61 relative to the connecting gear 72.

As shown by FIG. 5, a surface of the connecting gear 72 on a side opposed to the drive gear is formed with projected pieces 73a, 73b disposed at inside of a ring-like recessed portion 62A mentioned below. On the other hand, the kick member 61 is formed with a ring-like portion 62 to be brought into face contact with a surface on an outer peripheral side of the connecting gear 72 to form the ring-like recessed portion 62A between the kick member 61 and the collar 73. An inner peripheral face of the ring-like portion 62 is formed with a projected portion 62b disposed between the projected pieces 73a, 73b, an urge spring 77 is interposed between the projected piece 73a and the projected portion 62b to urge the kick member 61 in a rotation direction (clockwise direction of FIG. 5). Thereby, the kick member 61 is made to be able to rotate by a predetermined angle at a surrounding of the collar 73 disposed at a center portion of the connecting gear 72 and is supported in a state of being urged in the rotation direction by the urge spring 77.

Further, as shown by FIG. 6, the kick member 61 is formed with a pair of cam pieces 61A substantially at an interval of 180°, and an engaging portion 32d formed at the kick side plate 32B is made to be engageable with the cam piece 61A. That is, the engaging portion 32d of the kick side plate 32B moves inside of the rotating path of the cam piece 61A so as to be brought into a state of being engageable with the cam piece 61A in accordance with operating to rotate the switch lever 31. Therefore, by enabling the cam piece 61A to move in the rotation direction, the engaging member (engaging portion 32d of the kick side plate 32B) kicked by the kick member 61 moves inside of the rotating path of the kick member 61 without producing a dead point.

An explanation will be given of an operation of the fishing spinning reel constituted as described above.

First, as shown by FIG. 1, the switch mechanism 30 is brought into an ON state. Under the state, the stopper member 34 is engaged with the ratchet 3b, and therefore, the spool shaft 3a is brought into a fixed state, and the spool 3 is brought into a state of being operated with desired drag force through the front drag mechanism 17.

When the switch lever 31 is operated to pivot from the state shown in FIG. 1 in the arrow mark direction, the operating plate 32A constituting the operating member 32 is pivoted in the clockwise direction around the fixing screw 31a, in accordance therewith, also the kick side plate 32B is pivoted in the clockwise direction, and the engaging portion 32d at the front end moves inside of the rotating path of the cam piece 61A as shown by FIG. 2.

At this occasion, even when the kick member 61 is disposed at any position, the engaging portion 32d is made to be able to move inside of the rotating path without producing a dead point. That is, even when assumedly, in operating to pivot the switch lever 31, the engaging portion 32d is disposed at a position of interfering with the kick member 61 (cam piece 61A), by pivoting the engaging portion 32d, the kick member 61 can be rotated in the counterclockwise direction around the collar 73 against the urge force of the urge spring 77, and therefore, the dead point is not produced.

Further, by pivoting the kick side plate 32B in the clockwise direction, the contact portion 32e is brought into contact with the contact portion 34a of the stopper member 34 to pivot the stopper member 34 in the counterclockwise direction against the urge force of the spring 38a. Thereby, the engaging/disengaging portion 34b formed at the other end is detached from the ratchet 3b unrotatably fixed to the spool shaft 3a and the spool shaft 3a is brought into the free rotated state.

Under the state, the spool 3 is brought into a complete free state, and therefore, when a fish is caught, the fish line can be extracted as it is. Further, under the state, by operating to rotate the adjusting screw 21 of the sub-drag mechanism 20, the drag force can auxiliarily be operated to rotation of the spool 3.

Here, in a state of making the switch lever 31 OFF as shown by FIG. 2, when the rotor 2 is set to a state of being able to be rotated reversely, when a fish is caught or the like, the handle shaft 4 is rotated in the clockwise direction in FIG. 2. At this occasion, the cam piece 61A is rotated in the counterclockwise direction by a relationship of bringing the gear 70 and the connecting gear 72 in mesh with each other to be butted to the engaging portion of the kick side plate 32B to pivot the kick side plate 32B in the clockwise direction centering on the fixing screw 31a. As described above, the kick side plate 32B can be escaped relative to the operating plate 32A by a friction force of the friction spring 32C, and therefore, the switch mechanism 30 and the return mechanism 60 are not damaged thereby.

Further, in a state shown in FIG. 2, when the handle 5 is operated to wind, the gear 70 is rotated in the counterclockwise direction, and the connecting gear 72 is rotated in the clockwise direction. In accordance therewith, the cam piece 61A of the kick member 61 is butted to the engaging portion 32d of the kick side plate 32B, further, by rotating the connecting gear 72 in the clockwise direction, the projected piece 73b formed at the connecting gear 72 is butted to a wall portion 62a' of a projected portion 62a shown in FIG. 5 to rotate the kick member 61 in the clockwise direction. Thereby, the kick side plate 32B is pivoted in the counterclockwise direction through a cam piece 61A brought into contact therewith.

Pivoting of the kick side plate 32B is transmitted to the operating plate 32A through the friction spring 32C to pivot the switch lever 31 in the counterclockwise direction through the fixing screw 31a to automatically return to the state shown in FIG. 1. Thereby, the stopper member 34 is pivoted in the clockwise direction by the spring 38a, the engaging/disengaging portion 34b is engaged with the ratchet 3b to be switched to a restricting state of restricting rotation of the spool 3 again.

According to the fishing spinning reel having the above-described structure, the kick member 61 for returning constituting the return mechanism 60 is designed to be supported in a state of being urged by the spring in the rotation direction at the center portion of the connecting gear 72, and therefore, parts constituting a mechanism having no dead point can be arranged together on a supporting portion of the connecting gear 72 constituting the rotation member, thereby, the space of the mechanism having no dead point can be saved as less as possible and the reel main body 1 can be downsized.

Further, by arranging the center (indicated by line X) of the mesh portion of the gear 70 and the connecting gear 72 to be disposed on the side of the drive gear 7 more than the axis center X1 of the pinion gear 9, the kick member 61 can be arranged proximately to the side of the tooth face 7a of the drive gear 7 to be able to make the reel main body as thin as possible, as compact as possible and as light as possible.

Particularly, according to the embodiment, the gear 70 rotated by the drive gear 7 is arranged on the inner side in the radial direction relative to the teeth portion of the drive gear 7, and therefore, the gear 70 and the connecting gear 72 can be installed efficiently within a limited space, the reel main body can be made to be as thin as possible, as compact as possible and as light as possible further.

Further, although in the above-described structure, the kick member 61 is supported to be urged by the spring in the rotation direction to be able to be rotated by the predetermined angle and by the urge spring 77 on the collar 73 press-fitted to be fixed by the reel main body 1 through the fixing screw 75 at the center portion of the connecting gear 72, the kick member 61 may be designed to be able to be rotated by the predetermined angle relative to the connecting gear 72 and urged by spring in the rotation direction directly by an urge spring installed therebetween. Furthermore, the kick member 61 may be integrated to rotate integrally with the connecting gear 72.

Although the embodiment of the invention has been explained as described above, the invention is not limited to the above-described embodiment but can variously be modified.

The invention is characterized in that in the fishing spinning reel, in the switch mechanism of switching the drag operating state and the nonoperating state, the mesh portion of the connecting gear for supporting the kick member 61 of the return mechanism 60 for automatically returned to the initial position by the winding operation of the handle and the gear driven to rotate by the handle shaft is disposed on the side of the drive gear more than the axis center of the pinion gear and the other structure can pertinently be modified. For example, although the pinion gear 9 is designed to be supported by the bearings 9a, 9b on the both sides in the axial direction, the pinion gear 9 may be supported by two portions on the front side by deleting the bearing 9b on the rear side shown in FIG. 1. According to the structure, a space on an inner side in a diameter direction of the drive gear 7 can further effectively be utilized, the return mechanism can further efficiently be installed and the reel main body can be downsized. Further, the invention is applicable also to a fishing spinning reel of a rear drag type.

What is claimed is:
1. A fishing spinning reel comprising:
  a main body;
  a spool rotatably provided at a front portion of the main body, a fish line being wound on the spool;
  a handle rotatably supported by the main body;
  a drive gear rotated by a winding operation by the handle;
  a pinion gear brought in mesh with the drive gear;
  a rotor rotated by the pinion gear for winding the fish line on the spool through a fish line guiding portion;

a switch mechanism including an operating member for switching to a restricting state in which rotation of the spool is restricted and a free state in which the spool is allowed to rotate; and a return mechanism for returning the switch mechanism from the free state to the restricting state by operating the handle, wherein the return mechanism includes a kick member supported by a rotation member which is rotated in conjunction with the operation of the handle, the kick member being rotatable with respect to the rotation member by a predetermined angle and urged by a spring in a rotation direction; and wherein the kick member, the rotation member, and the spring are supported along the same axis offset from an axis of rotation of the drive gear.

* * * * *